United States Patent
Surcouf et al.

(10) Patent No.: US 10,757,067 B2
(45) Date of Patent: Aug. 25, 2020

(54) JUST IN TIME TRANSCODING AND PACKAGING IN IPV6 NETWORKS

(71) Applicant: Cisco Technology, Inc., San Jose, CA (US)

(72) Inventors: Andre Jean-Marie Surcouf, St Leu la Foret (FR); William Mark Townsley, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 116 days.

(21) Appl. No.: 16/094,982

(22) PCT Filed: Apr. 18, 2017

(86) PCT No.: PCT/US2017/028047
§ 371 (c)(1),
(2) Date: Oct. 19, 2018

(87) PCT Pub. No.: WO2017/184551
PCT Pub. Date: Oct. 26, 2017

(65) Prior Publication Data
US 2019/0149628 A1 May 16, 2019

Related U.S. Application Data

(60) Provisional application No. 62/324,727, filed on Apr. 19, 2016, provisional application No. 62/324,696, (Continued)

(30) Foreign Application Priority Data

Jul. 20, 2016 (GB) .................................. 1612581.7

(51) Int. Cl.
*H04L 29/12* (2006.01)
*H04L 12/749* (2013.01)
(Continued)

(52) U.S. Cl.
CPC ........ *H04L 61/1511* (2013.01); *G06F 16/955* (2019.01); *H04L 12/2803* (2013.01);
(Continued)

(58) Field of Classification Search
CPC .......... H04L 61/1511; H04L 29/06517; H04L 29/06163; H04L 61/6063; H04L 29/08045;
(Continued)

(56) References Cited

U.S. PATENT DOCUMENTS 8,467,405 B2 * 6/2013 Suzuki .................. H04L 12/185
370/390
8,549,167 B2 * 10/2013 Vonog ................. H04L 67/2823
709/231
(Continued)

*Primary Examiner* — Brian T O Connor
(74) *Attorney, Agent, or Firm* — Merchant & Gould P.C.

(57) ABSTRACT

A method and apparatus for delivering requested content over a network is described. The method includes receiving, by a first network node, a request from a second network node for the requested content, the request comprising an IPv6 address associated with the requested content. A longest prefix match is then performed between the IPv6 address associated with the requested content and IPv6 addresses associated with content available at the first network node. In the event that the longest prefix match does not result in an exact match between the IPv6 address associated with the requested content and any of the IPv6 addresses associated with content available at the first network node, the request is routed towards a content variant suitable for transcoding to the requested content, the content variant being stored at the first network node.

20 Claims, 3 Drawing Sheets

Related U.S. Application Data filed on Apr. 19, 2016, provisional application No. 62/324,657, filed on Apr. 19, 2016, provisional application No. 62/324,721, filed on Apr. 19, 2016, provisional application No. 62/324,710, filed on Apr. 19, 2016, provisional application No. 62/340,182, filed on May 23, 2016, provisional application No. 62/340,162, filed on May 23, 2016, provisional application No. 62/340,174, filed on May 23, 2016, provisional application No. 62/340,166, filed on May 23, 2016, provisional application No. 62/340,156, filed on May 23, 2016.

(51) Int. Cl.

| | |
|---|---|
| H04L 12/745 | (2013.01) |
| H04L 12/747 | (2013.01) |
| H04L 29/08 | (2006.01) |
| H04L 12/28 | (2006.01) |
| H04L 29/06 | (2006.01) |
| H04N 21/2343 | (2011.01) |
| H04N 21/658 | (2011.01) |
| H04N 21/643 | (2011.01) |
| H04N 21/845 | (2011.01) |
| H04L 12/723 | (2013.01) |
| G06F 16/955 | (2019.01) |
| H04L 12/721 | (2013.01) |
| H04L 12/725 | (2013.01) |
| H04N 21/262 | (2011.01) |
| H04L 12/743 | (2013.01) |
| H04L 12/26 | (2006.01) |
| H04L 12/741 | (2013.01) |
| H04N 21/2662 | (2011.01) |

(52) U.S. Cl.
CPC .. *H04L 29/06163* (2013.01); *H04L 29/06517* (2013.01); *H04L 29/08045* (2013.01); *H04L 43/0876* (2013.01); *H04L 45/306* (2013.01); *H04L 45/34* (2013.01); *H04L 45/38* (2013.01); *H04L 45/50* (2013.01); *H04L 45/72* (2013.01); *H04L 45/741* (2013.01); *H04L 45/742* (2013.01); *H04L 45/745* (2013.01); *H04L 45/748* (2013.01); *H04L 45/7453* (2013.01); *H04L 45/7457* (2013.01); *H04L 61/103* (2013.01); *H04L 61/15* (2013.01); *H04L 61/1582* (2013.01); *H04L 61/2007* (2013.01); *H04L 61/251* (2013.01); *H04L 61/2503* (2013.01); *H04L 61/256* (2013.01); *H04L 61/304* (2013.01); *H04L 61/6059* (2013.01); *H04L 61/6063* (2013.01); *H04L 63/1416* (2013.01); *H04L 63/166* (2013.01); *H04L 63/168* (2013.01); *H04L 65/4084* (2013.01); *H04L 65/605* (2013.01); *H04L 65/608* (2013.01); *H04L 67/02* (2013.01); *H04L 67/1002* (2013.01); *H04L 67/1008* (2013.01); *H04L 67/2823* (2013.01); *H04L 67/2842* (2013.01); *H04L 67/322* (2013.01); *H04L 67/327* (2013.01); *H04L 69/22* (2013.01); *H04L 69/326* (2013.01); *H04N 21/23439* (2013.01); *H04N 21/26258* (2013.01); *H04N 21/64322* (2013.01); *H04N 21/6581* (2013.01); *H04N 21/845* (2013.01); *H04N 21/8456* (2013.01); *H04L 61/35* (2013.01); *H04L 65/4007* (2013.01); *H04L 65/602* (2013.01); *H04L 69/329* (2013.01); *H04L 2212/00* (2013.01); *H04N 21/2662* (2013.01)

(58) Field of Classification Search
CPC . H04L 69/326; H04L 61/1582; H04L 65/608; H04L 61/2503; H04L 65/4084; H04L 61/15; H04L 45/306; H04L 45/38; H04L 45/50; H04L 61/304; H04L 61/103; H04L 67/1008; H04L 67/02; H04L 45/745; H04L 45/72; H04L 61/2007; H04L 45/34; H04L 67/2823; H04L 67/327; H04L 67/1002; H04L 67/322; H04L 65/605; H04L 61/6059; H04L 69/22; H04L 63/168; H04L 63/166; H04L 63/1416; H04L 61/256; H04L 43/0876; H04L 61/251; H04L 45/7457; H04L 45/7453; H04L 12/2803; H04L 67/2842; H04L 45/742; H04L 45/748; H04L 45/741; H04L 65/602; H04L 65/4007; H04L 61/35; H04L 69/329; H04L 2212/00; H04L 65/60; H04L 67/1097; H04L 12/2801; H04L 45/74; H04L 12/56; H04L 45/64; H04L 65/4069; H04L 61/6004; H04L 61/10; H04L 61/2528; H04N 21/845; H04N 21/26258; H04N 21/8456; H04N 21/64322; H04N 21/6581; H04N 21/23439; H04N 21/2662; H04N 19/40; G06F 16/955

See application file for complete search history.

(56) References Cited

U.S. PATENT DOCUMENTS

| | | | |
|---|---|---|---|
| 9,253,255 B1* | 2/2016 | Bosch | H04L 67/1093 |
| 9,712,412 B2* | 7/2017 | Schlack | H04L 43/0817 |
| 9,756,124 B1* | 9/2017 | Bosch | H04L 67/1093 |
| 9,871,722 B2* | 1/2018 | Ou | H04L 61/1511 |
| 9,948,550 B2* | 4/2018 | Ge | H04L 45/306 |
| 9,948,557 B2* | 4/2018 | Fan | H04L 12/6418 |
| 9,960,999 B2* | 5/2018 | Azgin | H04L 45/748 |
| 10,313,415 B2* | 6/2019 | Surcouf | G06F 16/00 |
| 2005/0182829 A1 | 8/2005 | King et al. | |
| 2010/0061369 A1* | 3/2010 | Suzuki | H04L 12/185 370/390 |
| 2011/0252082 A1 | 10/2011 | Cobb et al. | |
| 2016/0036730 A1 | 2/2016 | Kutscher et al. | |

* cited by examiner

JUST IN TIME TRANSCODING AND PACKAGING IN IPV6 NETWORKS

TECHNICAL FIELD

The present disclosure relates generally to the application of Just in Time (JIT) Transcoding in a network, in particular it relates to JIT transcoding and packaging in IPv6 networks.

BACKGROUND

Over recent years, the use of content delivery networks (CDNs) has grown rapidly. These networks allow content providers to distribute content to consumers. The general principle here is that rather than each user (or consumer, or client) connecting directly to a central server, each client connects to one of many nodes or caches, distributed around the world. Requests from each consumer are routed to an appropriate node, based on the routing policy of the particular network, for example taking into account geographical location of the user and the node, and/or network traffic at each node. Each cache is typically able to either supply the data requested by the consumer, or if it does not have the requested data, forward the request to a node which does have it.

BRIEF DESCRIPTION OF THE DRAWINGS

Embodiments of the method and apparatus described herein are illustrated in the Figures in which.

DETAILED DESCRIPTION

Overview

Aspects of the invention are set out in the independent claims and preferred features are set out in the dependent claims. Features of one aspect may be applied to each aspect alone or in combination with other aspects.

Described herein is a method for delivering requested content over a network. The method includes receiving, by a network node, a request from another network node for the requested content, the request comprising an IPv6 address associated with the requested content, and sending the request to the network. The network then routes the request to a suitable node by performing a longest prefix match. In the event that the longest prefix match does not result in an exact match between the address associated with the request and an address of content available at the node, the request is routed towards a content variant suitable for transcoding to the requested content, the content variant being stored at the node.

There is also described herein an IP header for a content request sent by a client, the header having a variant portion, the variant portion specifying one or more of: the portion of the content which is being requested, a screen resolution of a client device, the geographical location of the client, the resolution of video content requested by the client, the file format requested by the client, subscriber information associated with the client, an encoding for the content which is being requested or a language in which the content is being requested.

Apparatus for implementing the method, including network nodes, computer programs, computer program products, computer readable media and logic encoded on tangible media for implementing the method are also described.

Example Embodiments

Networks such as local area networks and wide area networks are well known and are often utilised for both storing and moving data at and to/from nodes. One such example of a wide area network is the internet. These nodes may request data from one another. They can do this in one of two ways they can either address a request to another node, or they can address a request to the information that they require. This is the difference between information centric networking and a host centric paradigm.

The network forming the internet is made up of a large amount of nodes. These nodes may be clients, switches, servers, routers or other such devices. Traffic that is sent and stored on the network is controlled by the internet protocol. It has been standard practice in the art and been dictated by the protocol that each node in the network will have its own IP address (internet protocol address).

Figure 1:
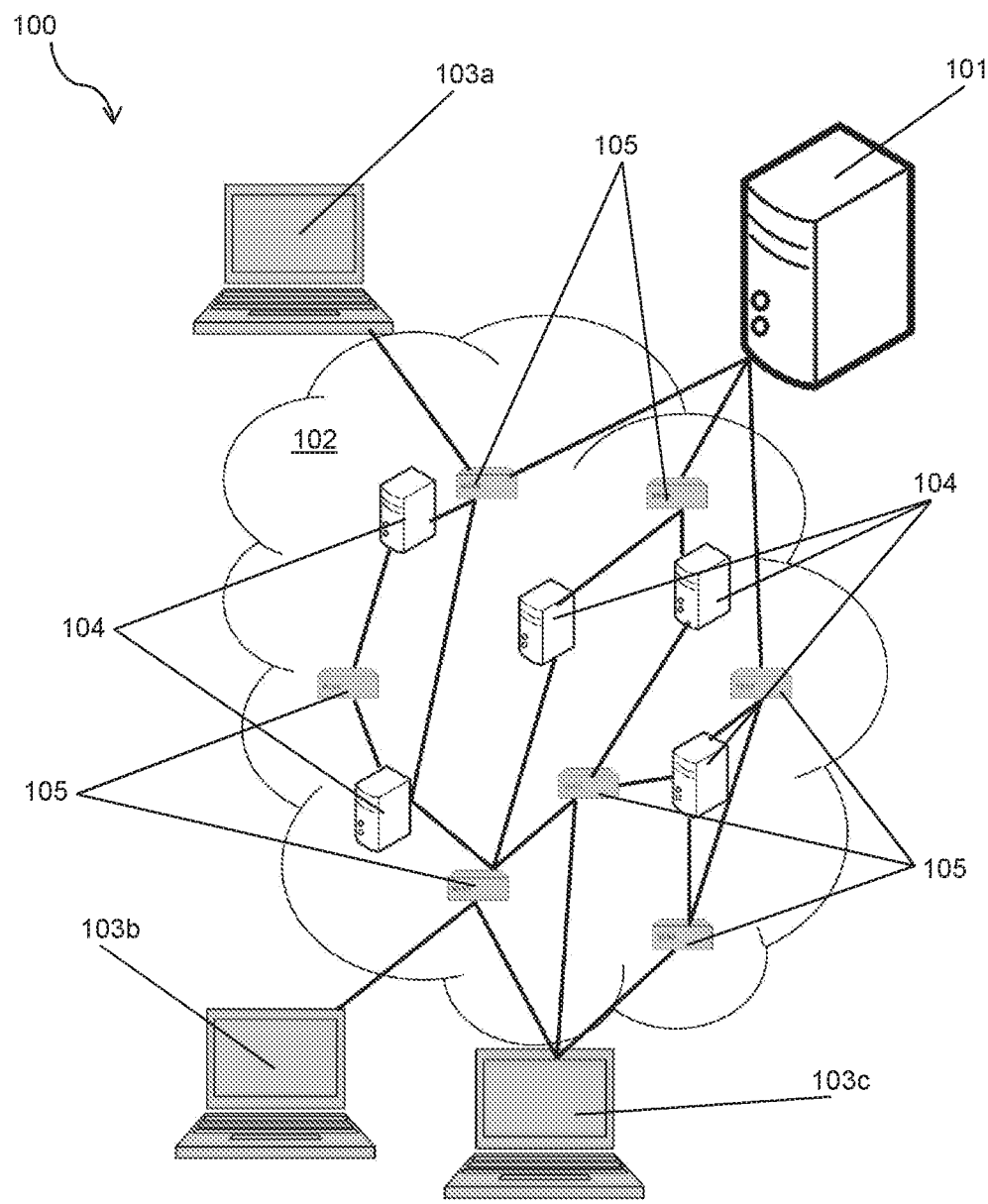
FIG. 1 shows a typical network arrangement according to one embodiment.

FIG. 1 shows a standard network configuration 100 with clients (or consumers, or users) 103a-c, a main server 101, routers 105 and caches 104. Note that identical numbering has been used for features which are functionally equivalent to one another, e.g. all the caches 104, and all the routers 105. This should be interpreted as meaning that each cache has broadly the same functionality as each other cache, although the exact content stored on each, and the technical capabilities of each may vary. Similarly, each router 105 is arranged to operate in broadly the same way as each other router, and importantly they are all interoperable with each other, but specific functioning and capabilities may vary between routers.

Figure 2:
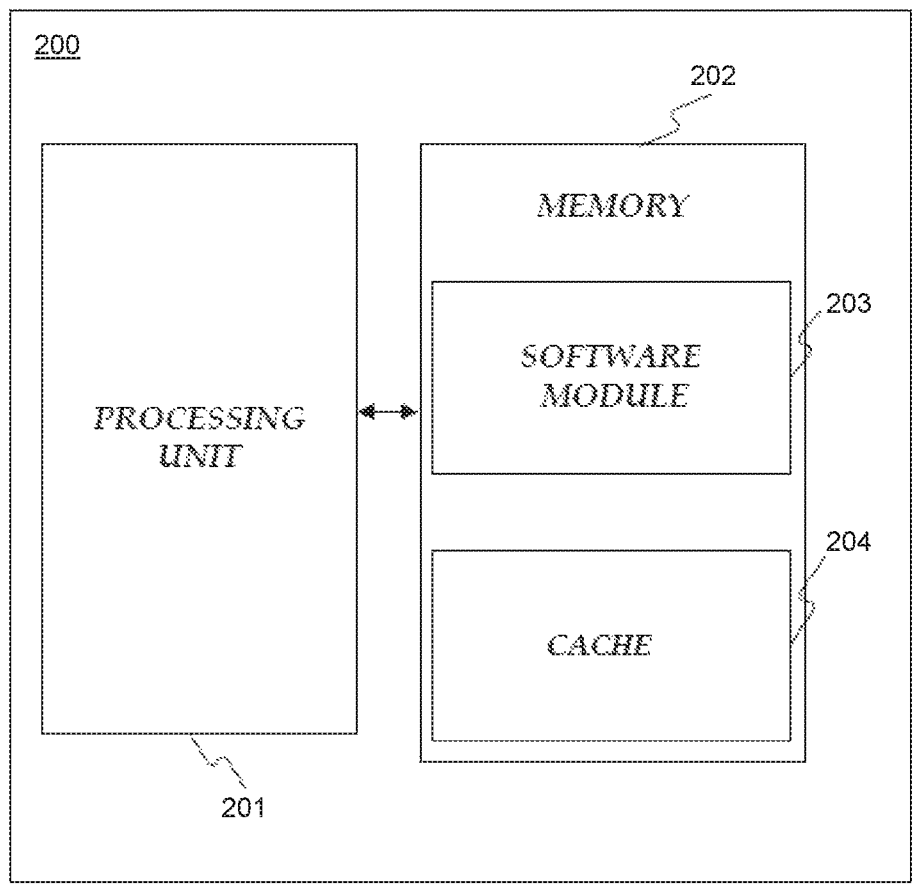
FIG. 2 shows a block diagram of a network node comprising cache according to one embodiment.

FIG. 2 shows a block diagram of a network node 200. The node has within a node memory 202 that is used to store content that can be accessed by other nodes on the network. Content is stored in this memory 202 according to several algorithms; for example, the content most recently served by any particular node may be stored at that node. As used herein, a network node may refer to a router or a server. In particular, the router or the server may be able to handle requests for content to be delivered and to facilitate such delivery from its own local storage, or from nearby storage from which it can request the content. Moreover, network nodes may generally implement the methods described herein, relating to transcoding of content from master (or mezzanine) files as required, for supply to a user who requests such content.

FIG. 1 shows some clients 103 a-c and illustrates how they can receive data over a network 102, which could be the internet, for example. A request from a client 103 is forwarded to a cache 104, based on known routing policies. If the cache 104 does not have the exact content requested, it can either redirect the request to another node, for example it may redirect the request to a main server 101 that is the provider of the content.

Alternatively, as set out below in greater detail, the cache 104 can try to generate the requested content itself. In some cases, for example when a request is made for data for which there is no exact match, but where the request relates to a variant of content which is stored on the node, the content may be served anyway, by generating the requested variant from the available, related content. In particular, where the node has access to a copy of a master (or mezzanine) file associated with the requested content, it is able to generate all possible variants from this, upon request.

Typically, routing is performed using Internet Protocol (IP) addresses. The IP version currently in use is IPv4, which uses 32 bits to provide a unique address to every node on a network. This provides a little over 4 billion addresses, and it has been recognised for some time that the rate of growth of the internet is quickly rendering this number inadequate. To solve this problem, a new version of the Internet Protocol has been developed. This new version, IPv6, uses 128 bit addresses, allowing a total of around $3.4 \times 10^{38}$ addresses.

IPv6 networks provide auto-configuration capabilities. They are simpler, flatter and more manageable, especially for large installations. More importantly, addressing data directly is possible due to vast address space and the need for network address translation devices is effectively eliminated.

Figure 3A:
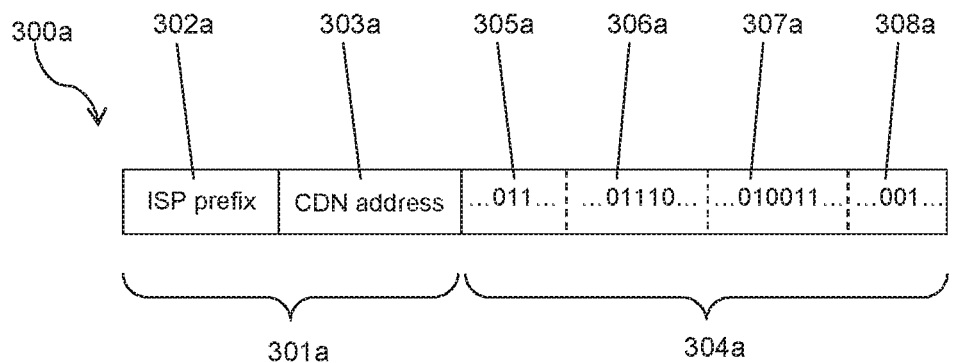
FIGS. 3A to 3C show various IPv6 addresses for use in embodiments of the present system.
Figure 3B:
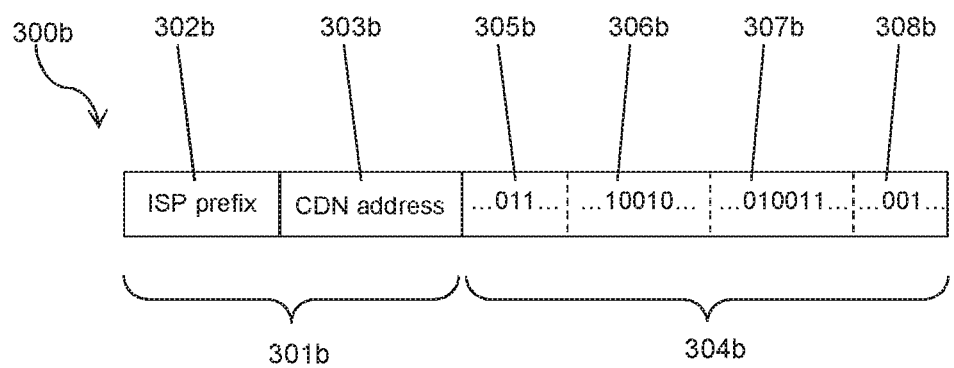
Figure 3C:
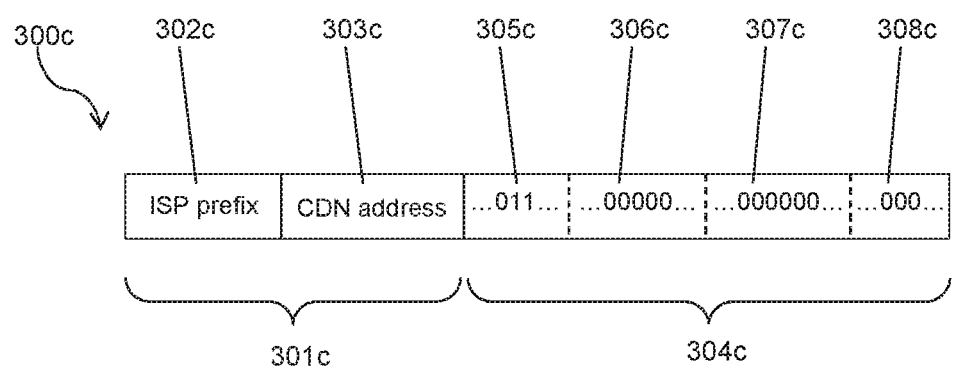

The address is designed to consist of two parts, a 64-bit prefix that is used for routing and a 64 bit interface identifier. The interface identifier was originally designed to identify a host's network interface. However, it has been realised that the interface identifier can be used to directly address content instead. Therefore, individual pieces of content will have their own IP addresses, as shown in FIGS. 3A to 3C, and as described in more detail below. This means that instead of routing to a particular node in the network, and asking that node to search its cache for matching data, traffic can be routed directly to specific content.

Of course, while splitting the 128 bits of address into two 64 bit portions is one current convention, it is possible to split an IPv6 address at any point, so that the first portion containing the routing information is a different size from the second portion describing the file information. In particular, given the large number of combinations of content and variants, it may be preferable to reduce the routing portion to a minimum, so that the content description can be as large and varied as possible. In time, for example, a shift could occur to purely Information Centric Networking, in which addresses link directly to data, and the physical address model central to IPv4 is abandoned.

The address space in IPv6 is so vast, that large files (for example movies) can be split into a plurality of chunks, and each chunk can have its own address. In that way, for example, media content that can be of many hours' duration (such as a film or broadcast of a sporting event) can be divided into a number of segments of shorter playback time (such as between 2 and 30 seconds, although any length is in principle possible).

Moreover, the address space is so large that even the large number of possible variants for a given file (or even for each chunk of a given file) can be given a unique address. When a network device, such as a client device, requests particular media content, such as a particular video file, it obtains all of the chunks of data that make up that media content. Dividing the content into chunks improves distributed networking by allowing a subdivision of files. This prevents network congestion, and allows for greater dispersion of content around the network.

Prior to storage, the media content is divided into shorter chunks or segments, including variants of each chunk and stored at various servers in the network. The variants may be, for example, encoded at different bit rates or may have different formats for playback through a variety of different end user devices (Internet connected TVs, set top boxes, mobile devices including smartphones, laptops etc.).

When a client requests content from a CDN, the exact variant of the content requested may vary slightly depending on the client, for example due to different screen sizes, different geographical location, or different devices requiring content in particular file formats. The caches of a CDN may therefore store not just a wide selection of content, but also multiple variants of each piece of content.

The design of any CDN involves a trade-off between storage and computation requirements. Taking a purely storage-based approach means that every piece of content, and each variant of each piece of content, which a client (or user) may request is stored on at least one network cache. Clearly with the large number of different pieces of content, and the potentially large number of possible variants, this could soon become impractical.

A purely computational approach, on the other hand, would involve each node to store only a single master copy (known as a mezzanine file) of each piece of content. When a user requests content which is a variant of the master file, the node generates content which matches the request on the fly. This process is known as Just in Time (JIT) transcoding. While this dramatically reduces the storage requirements of the node, the computational demands are large. The result of this operation can in turn be stored for a given period of time, which in turn increases the storage space required.

CDNs typically implement a system part way between these two extremes, to reduce the overall cost of the system. However, JIT is rarely used in CDNs, mainly because it is difficult to manage, meaning that the weighting of the CDN is typically more towards storage than computation. As a consequence, JIT does not form an integral part of a CDN system, it is more used for corner cases such as long tail content or rarely requested format.

In the classical CDN approach where contents are represented by classical URLs, this can lead to high caching management complexity since it can be difficult to identify variants of content. As an example, since a variant of a particular piece of content is represented by a URL, detecting that this variant is not available at least in one cache of a CDN requires a lot of application level processing.

When a CDN is set up using IPv6, JIT becomes a viable option for the primary way for a network to supply content to users, as is described in detail below.

FIG. 3A illustrates an IPv6 request, showing the structure of the 128-bit address. The address comprises an initial portion known as a prefix, which typically indicates the content provider, and helps to route the request to the correct nodes. The rest of the address narrows down to the specific content required. For example, this may be broadly the title of a movie, which may narrow further to a specific chunk of that movie. Further narrowing may occur when variants of this chunk are specified by progressively later bits of the address.

An advantage of the IPv6 system is that each variant of each chunk can have a separate address. Moreover, as shown in FIGS. 3A to 3C, the variants can have similar addresses to one another, such that the same bits in the address of any chunk can be used to relate to the same variant type. To give a specific example, there may be four different resolutions at which any given chunk of content may supplied. Therefore, two bits of the address, for example the $90^{th}$ and $91^{st}$ bits may represent the four available resolutions. By using the IPv6 addresses in this way, it is simple for the network to determine not just whether it has the requested contents, but also whether it has similar content, for example, the same chunk at a different resolution.

In this way, parts of the address act like flags to denote various parameters of the chunk to which they relate. Of course, any logical scheme for denoting variants can be chosen by a content provider, depending on the variants they plan to offer.

When a network receives a request from a client, it examines the full address (which in IPv6 can be the address of the actual content, not just a network node), and forwards the request to a node, or cache, where that content is available. Examples of IPv6 addresses are shown in FIGS. 3A to 3C. In these figures, each IPv6 address 300 has a routing portion 301 at the beginning and a content portion 304 at the end. The routing portion is used to route requests to the correct node in the network, much in the same way that an IPv4 address is used to deliver content and requests to the correct network location. The routing portion 301 comprises an ISP prefix 302 and a CDN address 303. It is possible, however, to route directly to content, in which case the routing portion 301 may be dispensed with in favour of an expanded content portion 304.

Indeed, any prefix in the content portion 304 may be considered to be a part of the routing portion 301. In this case, for example, the content portion 304 may include information to identify the content provider, and therefore it may be more appropriate to class it more as routing information than as content information. This demonstrates the variations which are possible in the granularity of the routing, and consequently the flexibility of the options which are available to manage the content delivery network, as addresses can be assigned in a logical format, in which addresses to the content are assigned according to a predetermined addressing scheme, such that the addresses include information for identifying or describing the content.

The content portion 304 comprises content and variant flags 305, 306, 307, 308. These are segregated from one another by dashed lines to indicate that the content provider is free to subdivide the content portion 304 according to their own requirements. The content and variant flags may represent various aspects of the content. For example, portion 305 may represent the name of the content, or some other identifier to determine it. To give a specific example, portion 305 may represent the name of a movie, or the title (or the series and episode number) of an episode of a television show.

To further narrow down to a specific piece of content, portion 306 may represent a variant of the content, for example, it may represent content having a particular bit rate, or screen resolution, or in a particular file format.

Narrowing yet further, portion 307 may specify a particular chunk of the content, for example the first 5 minutes of the movie designated by portion 305, while portion 308 may represent further information defining the chunk. In the event that content has not been chunked, the fields identifying chunk information can be set to 0, as a default to indicate that there is no chunk information, as the content has not been broken down into chunks.

Note that by defining a set of rules for interpreting addresses, particular chunk of content, once a piece of content, e.g. a movie has been allocated a portion of the address space, the addresses of the chunks, and the addresses of the variants of the chunks are easy to determine. Of course, the order in which portions 305, 306, 307 and 308 are presented can be varied according to a particular content provider's requirements. Indeed, there may be more or fewer subdivisions of the content portion 304, according to specific requirements.

When the node receives the request for content, it is able to quickly compare the address of the request 300a with addresses of content 300b stored in its memory. The node may not have an exact match for various reasons. For example, the initial forwarding of the request may have been made using out of date information, and the content may have been deleted from the cache. Alternatively, the forwarding may be the result of the network knowing that a particular node has a variant of the requested content, but did not check that the full variant details were available.

Another possibility is that the network is deliberately designed to incorporate some degree of JIT transcoding. In this case, nodes would advertise more content than they strictly have available, by advertising all variants of a particular piece of content (or even a chunk). As described herein, the nodes are able to deliver the variants of the content by transcoding from a mezzanine file. The exact details of the network routing prior to the request reaching a node may be varied by a network operator, depending on their requirements.

Comparing FIGS. 3A and 3B, it can be seen that portions 306a and 306b do not match. Typically, the matching process uses a longest prefix match. This works by starting at the beginning of two addresses, and proceeding until a point is reached where the two addresses do not match. In the example of FIGS. 3A and 3B, the portions 306a and 306b do not match. In this example, the node interprets this as the client request 300a being directed towards a piece of content which is stored in the cache, but for a variant which is not stored in the cache.

However, since the structure of the addressing system allows the system to understand the nature of the content which is requested directly from the requested address, it is possible to create content to satisfy a request, even if that particular variant is not stored in the node cache.

One way to do this is to store a mezzanine file 300c at each node. This could be designated by filling in the content identifier 305 (e.g. the file name, title etc.) to identify the content, but for example leaving the other bits all set to zero, or any other predetermined value which is interpreted by the nodes forming the network that the file in question is a mezzanine file. It is then very easy for the node to direct any request for which it does not have matching content directly to the mezzanine file.

In any event, the request is received by a cache of the network. By performing a longest prefix match, it is easy to determine how similar the content of the request is to content stored at the cache. Obviously in the case of an exact match, the solution is simple; the cache simply returns the content to the client. In the case where a match is not exact, for example, compare FIGS. 3A and 3B, it can nevertheless be clear to the node that the request relates to a chunk that the node possesses, but in a different variant.

In a particular variant, each node can be supplied with a mezzanine file for each piece of content. By default, the mezzanine file could be addressed by setting all the variant bits to zero, for example, as shown in FIG. 3C. When the node identifies a partial match, for example when the node matches the file name, but one or more of the variant bits of the request do not match the address of any of the content stored at that node, then the node can redirect the request to the mezzanine file. In this way, the content can be served, even if it is not in the exact format requested by the client.

While this is the simplest implementation, the use of IPv6 addresses allows for a great degree of subtlety and control in how a network processes requests and delivers content. For example, instead of linking to a mezzanine file, and delivering the content directly, the linking to the mezzanine file could instead start a workload. Once the node has identified a partial match, examination of the address of the request will tell the node what content the client would like (specifying file format, video resolution, audio encoding, language options, subtitles, etc.).

When the request is rerouted to the mezzanine file, the node can initiate processing, using the request as an input. The processing initiated by the node beings the process of transcoding the mezzanine file into the requested format. Once this transcoding is complete, the requested variant of the content can be packaged and sent to the client. Since the request forms an input to the transcoding operation, the generated content is guaranteed to match the request.

It is important to package the data before it is sent to the client to ensure that the content is correctly deliverable to the client. While this is already performed by content providers, the inclusion of an address directly to the content (e.g. an IPv6 address) is beneficial to the network in implementing the various routing and caching policies required of it. Indeed, packaging helps to ensure that the content acquires the correct address, according to the addressing rules being operated by the node. Packaging enables the content creation and distribution to be carried out with the IP network in mind. The content can be packaged as a whole, or as individual chunks. Encapsulation of the content with an IPv6 header to identify the content prior to sending it to the client allows for efficient routing and delivery of content over an IPv6 network.

A workload created in this way can be a multiple workload in the present system. That is to say, many network locations (e.g. caches) could receive the request simultaneously, and start to generate content. This may be designed onto the network, to force seeds to be cached at distributed locations, or it may be triggered only when a particular piece of content or chunk of content has been determined to be particularly popular. In this way, several seeds could be created for the same missing content, and multiple caches can be populated with the content, e.g. for future use.

Since the workload is triggered as soon as the node receives a client request, the workload can also internally perform a longest prefix match between the address of the client request and the content it has stored locally, for example to select a best start point (that is, input data) to minimise the computation required to generate the requested content. In the manner described above, a fully distribute JIT transcoding and packaging system is intimately (since each node is configured to perform JIT) and transparently (due to direct addressing of content) integrated into the network.

Note that the use of IPv6 addresses to denote specific data (either entire files, or chunks thereof) allows the network to check whether it has the data very quickly. It is also very quick for the network to determine what the client is asking for, and provide this by transcoding, if necessary prior to packaging and sending the content to the client.

Now that the requested variant of the content has been created and delivered to the client, the system can make a decision as to whether to keep a copy of this content in the cache, or delete it. Once more this is a choice for specific network operators to make, depending on their requirements, but it is likely that a factor in the decision making process will be how likely it is that the same content variant will be requested in the future.

For example, a cache may decide to delete content to free up space for more frequently requested content. This is a valid choice, since a network having JIT as a fundamental part of its policy can always create content as requested, on the fly so long as it can access a corresponding mezzanine file. In this way, each network node can load balance between computation and storage resources, thus improving the network overall.

If a decision is made to store the content variant in the cache, this may be stored indefinitely. That is, stored until the cache is full, at which point a new instruction to write to the cache causes e.g. the least used content to be overwritten. Alternatively, the content can be written to the cache, and time to live (TTL) can be used to specify how long the data remains stored in the cache. The TTL may be reset each time the cache serves that version of the content. Alternatively, each time any version of a particular piece of content is requested, the TTL of every version of that particular piece of content may be reset. In any event, while the content is stored in the cache, the node can advertise that it holds this content variant.

When a request for that content variant next propagates the network, the network knows how to forward the request to that particular node. If the forwarding is based on out of date advertisements, it is possible that the TTL has expired, and the content variant has been deleted, in which case the node can be instructed to generate the content again. Of course, if the TTL has not expired, and the content remains on the node, the content can be supplied to the client very quickly. In this case, a second request for the same content can reset, the TTL timer, or even extend it beyond its initial value in recognition of the popularity of the content variant in question. In addition to advertising the presence of the content variant on a node or cache, the advertisement can also include an advertisement of the TTL.

In other words, the newly created variant becomes a cache entry managed as any other cache entries. The above descriptions are just examples but any more elaborated cache policy can also apply.

The cache can be responsive to more than just client requests for content. For example, since the purpose of CDNs is to store popular content in a distributed manner, to reduce the time taken to acquire that content, the network can be configured to recognise that certain content and/or content variants are highly popular. Upon identifying a particular content variant as popular, the content variant created by a node can be propagated through the network to form a distributed set of cached content variants. This propagation can be achieved by caches requesting content from other caches directly.

As set out above, such a system allows full integration of JIT Transcoding functionality in a distributed CDN system. This results in an improved management of resources. It also greatly simplifies global CDN management since, instead of relying on complex CDN application logic, this system allows the network to trigger content JIT transcoding. In previous networks, the only way of triggering a JIT event would be for a failed series of routing requests to force the CDN to generate the content as a last resort. This is because, as has been explained, JIT can be hard to correctly manage and implement in other networks, so there has typically been a drive to use JIT only rarely, for example when it is the last chance for the network to deliver the content, rather than deliver a failure notification.

Coupling embodiments of this system to network telemetry also allows the network to make better "what to keep in cache" decisions, thus contributing to better CDN resources usage.

Note that improved network telemetry is possible by using IPv6 addresses in the manner described above, because now the network knows not just how much data is flowing between which endpoints, but it knows exactly what that data is. The network has information readily available on exactly which pieces of content are popular, where in the world they are popular, which device types are requesting the content, and in what format, all from the addresses being used. This allows the network to intelligently populate its caches, using only address information of content which it is already delivering.

Applying the above mechanisms at scale allows the creation of a CDN which at a minimum may know only the location of a mezzanine file for each piece of content (or for each subset of content, that is, each chunk). Then seeds can be created for each variant (potentially all the way down to chunk level). These seeds can start propagating across the CDN. The number and distribution of each copy of content variants can be adjusted by a network operator by implementing policies. A simple example of this is to use TTL, as set out above, to determine availability of content variants. This may find particular use in managing the distribution of for long tail contents or rarely requested variants.

It will be appreciated that each piece, or chunk, of content may be required in many different variants. The growing number of options for variants of content and the steady increase in the amount of content available makes storage a real concern. Aspects of the present system aim to improve the decision making process for storing or creating variants of content and in some embodiments can fully automate this process at the network level, thereby reducing the need for complex application logic.

The above description makes reference to mezzanine files as the source file which is transcoded in order to generate the requested content. It will be clear to the skilled person that depending on the requested format, a mezzanine file need not be the source. For example, it may be possible to transcode to a requested screen resolution from any higher screen resolution, rather than requiring the mezzanine file (which implicitly has the highest screen resolution available).

Therefore, references in the specific examples above to a mezzanine file should be interpreted as meaning that in the general case, transcoding may be performed starting from any suitable pre-existing piece of content (for example a content variant suitable for transcoding to the requested content), and generating the requested piece of content from this. In this context, content variant may mean a piece of content which represents the same piece of content as the requested piece of content (e.g. the same time period of the same episode of the same television series), but has different parameters describing that piece of content such as codec, screen resolution, framerate, etc. In this way, a human viewer may not appreciably notice the difference between the requested content and the variant content, as it contains much the same visible and audio information, while the nodes of the network would view the content as entirely different, albeit linked by one or more content descriptors in the address.

Moreover, in this context, "suitable for transcoding" means that the variant content is able to be transcoded to the requested content. An example of variant content which is not able to be transcoded to requested content is when the resolution or quality of the requested content is higher than any content variants which are locally available. In this case, there is no way that the transcoding process can improve the quality or resolution of the available content, so the request cannot be satisfied, even by transcoding. In some embodiments, the content may nonetheless be served in response to the request, if the available content is close to the requested quality, and the other parameters are available, either directly or by transcoding.

Similarly, where references are made above to a client, or user, requesting specific content, embodiments will be apparent that the request may originate from another network node. For example, the transcoding methods described in detail above may be used to propagate particular versions of selected content around the network, so that it is readily available for clients to access locally. This arrangement may allow caches to be populated with appropriate content (and appropriate versions thereof) in advance of such content actually being requested locally to that node.

In addition, when the content is prepared in the manner described above, the content may be packaged prior to sending it to a user. In a general context, packaging primarily concerns specifying the parameters of the transport layer protocol which will be used to convey the data from a storage location to a user. When the content being delivered is video (whether live or prerecorded), packaging may primarily concern selecting an appropriate container, for example .mp4 or .mkv containers. Different packaging types may be used depending on the specific circumstances. For example, it may be preferable for certain applications (e.g. live broadcasts or internet-based phone calls) to deliver packets in the correct order, or for packets to arrive via a low latency path (to minimise time delay).

Similarly, in other applications, it may be preferable to provide strong robustness against errors, offering error correction in the transport layer, or packets may be routed in such a way that they that the packets avoid lossy or dangerous routes. In any case, the transcoder may be provided with the means to package the data appropriately for the type of data it has created.

The present disclosure also envisages one or more computer programs, computer program products or logic encoded in computer-readable media for implementing any method claimed or described herein. It will be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Throughout the description, references to components or nodes of the network should be construed broadly, and in particular may comprise several subcomponents or modules working in combination to achieve the stated effects. These subcomponents may themselves be implemented in hardware or software. Likewise, many different components may be combined together as one component, for example a single processor may carry out many functions simultaneously. Similarly, any reference to operational steps may comprise hardware, software, or a combination of the two. As already noted, any method described herein, or any part thereof may be carried out by a computer program, or a computer program product.

References herein to components being connected to one another should be interpreted as meaning either directly connected, or indirectly connected, for example being connected via other components. Indeed, in the case of complex networks, components may be both directly and indirectly connected to one another. Examples of such connection may commonly include, but are not limited to: electronic connections through wires or cables; fibre optic connections; and wireless communication, for example via radio waves, microwaves or infrared.

In the present disclosure, references to networks should be interpreted broadly. In particular, the internet is often used as an example of a network, but is not limiting. The principles set out herein are applicable to all networks, comprising a collection of processors connected to one another. Connection may be direct, or via switches and routers. The network may further comprise servers and caches, depending on the exact nature of the network. When storage is discussed herein, this may include, without limitation one or more of magnetic, optical, solid state, volatile or non-volatile memory.

The steps associated with the methods of the present disclosure may vary. Steps may be added, removed, altered, combined, and reordered without departing from the scope of the present disclosure. Indeed, different aspects and embodiments of the disclosure herein may be combined with one another, in any combination and may be implemented in conjunction with one another in a particular network. In particular, individual components, and systems of components may be combined, the tasks of a single component divided between many subcomponents, or equivalent components interchanged without departing from the principles set out herein. Furthermore, features of one aspect may be applied to other aspects of the system.

Therefore, the present examples are to be considered as illustrative and not restrictive, and the examples are not to be limited to the details given herein, but may be modified within the scope of the appended claims.

The invention claimed is:

1. A method for delivering requested content over a network, comprising:
 receiving, by a first network node, a request from a second network node for the requested content, the request comprising an IPv6 address associated with the requested content;
 performing a longest prefix match between the IPv6 address associated with the requested content and IPv6 addresses associated with content available at the first network node; and
 in the event that the longest prefix match does not result in an exact match between the IPv6 address associated with the requested content and any of the IPv6 addresses associated with content available at the first network node, routing the request towards a content variant suitable for transcoding to the requested content, the content variant being stored at the first network node.

2. The method of claim 1, wherein the content variant is a mezzanine file associated with the requested content.

3. The method of claim 1, wherein the first network node, upon receiving a request for requested content which is not stored at the first network node, identifies from the request the form that the requested content should take to match the request.

4. The method of claim 1, wherein routing the request towards the content variant comprises initiating a workload associated with the content variant.

5. The method of claim 4, wherein the workload comprises transcoding at least a portion of the content variant to produce generated content, the generated content matching the requested content.

6. The method of claim 5, wherein the address of the request is used as an input to the transcoding operation, to ensure that generated content matches the requested content.

7. The method of claim 5, further comprising delivering the generated content to a client.

8. The method of claim 7, further comprising discarding the generated content once it has been delivered to the client.

9. The method of claim 7, further comprising storing the generated content at the first network node for a predetermined time.

10. The method of claim 9, wherein the first network node advertises the content while the content is stored at the first network node.

11. The method of claim, wherein the address associated with the content includes a portion which specifies one or more of:
 a chunk of content which is being requested;
 a screen resolution of a client device;
 a geographical location of a requesting client;
 a resolution of video content requested by a requesting client;
 a file format requested by a requesting client;
 subscriber information associated with a requesting client;
 an encoding for the content which is being requested; or
 a language in which the content is being requested.

12. A network node for delivering requested content in response to a request comprising an IPv6 address associated with the requested content, the network node comprising:
 a memory; and
 a processor;
 wherein the memory stores pieces of content, each piece of content having a unique IPv6 address in the memory; and
 in the event that the request includes an IPv6 address associated with content not available on the network node, the network node is configured to perform a longest prefix match on the request to identify a content variant stored at the network node and suitable for transcoding to the requested content.

13. The network node of claim 12, further comprising a transcoder, wherein the network node is further configured to transcode at least a portion of the content variant to generate the requested content as generated content.

14. The network node of claim 13, further configured to store the generated content in the memory of the network node for a predetermined amount of time.

15. The network node of claim 13 or 14, wherein the transcoding comprises generating content from the content variant, by changing one or more of:
 a resolution of video content;
 a file format; or
 an encoding for the content.

16. An apparatus comprising a processor and a memory for storing a network cache, the apparatus being arranged for delivering requested content in response to a request comprising an IPv6 address associated with the requested content, wherein:
 the memory stores pieces of content, each piece of content having a unique IPv6 address on the cache; and
 in the event that the request includes an IPv6 address associated with content not available on the cache, the cache is configured to perform a longest prefix match on the request to identify a content variant stored in the memory and suitable for transcoding to the requested content.

17. The apparatus of claim 16, wherein the content variant is a mezzanine file associated with the requested content.

18. The apparatus of claim 16, wherein request is received from a client.

19. The apparatus of claim 16, wherein the requested content is delivered to a client.

20. The apparatus of claim 16, wherein the requested content is delivered to another network node.

\* \* \* \* \*